(12) United States Patent
Ma et al.

(10) Patent No.: US 12,265,567 B2
(45) Date of Patent: *Apr. 1, 2025

(54) ARTIFICIAL INTELLIGENCE ASSISTED ORIGINALITY EVALUATOR

(71) Applicant: American Chemical Society, Washington, DC (US)

(72) Inventors: Yinghao Ma, Potomac, MD (US); Chengmin Jiang, Potomac, MD (US); Sonja Krane, Blue Bell, PA (US); Jofia Jose Prakash, Aldie, VA (US); Utpal Tejookaya, Springfield, VA (US); Jeroen Van Prooijen, Fairfax, VA (US); Jonathan Hansford, Burke, VA (US); Jinglei Li, Falls Church, VA (US); Wallace Scott, Fairfax Station, VA (US)

(73) Assignee: American Chemical Society, Washington, DC (US)

( * ) Notice: Subject to any disclaimer, the term of this patent is extended or adjusted under 35 U.S.C. 154(b) by 122 days.

This patent is subject to a terminal disclaimer.

(21) Appl. No.: 17/733,351

(22) Filed: Apr. 29, 2022

(65) Prior Publication Data
US 2022/0350828 A1   Nov. 3, 2022

Related U.S. Application Data

(60) Provisional application No. 63/181,560, filed on Apr. 29, 2021.

(51) Int. Cl.
*G06F 16/33* (2025.01)
*G06F 16/31* (2019.01)
*G06F 16/334* (2025.01)

(52) U.S. Cl.
CPC ........ *G06F 16/3347* (2019.01); *G06F 16/328* (2019.01)

(58) Field of Classification Search
CPC ........................... G06F 16/3347; G06F 16/328
See application file for complete search history.

(56) References Cited

U.S. PATENT DOCUMENTS 9,483,532 B1   11/2016   Zhang et al.
11,531,707 B1 * 12/2022  Samdani ............... G06F 16/335
(Continued)

OTHER PUBLICATIONS

Gelman, et al. Toward a Robust Method for Understanding the Replicability of Research. SDU@ AAAI, published Mar. 21, 2021 (eight pages).

(Continued)

*Primary Examiner* — Baoquoc N To
(74) *Attorney, Agent, or Firm* — FINNEGAN, HENDERSON, FARABOW, GARRETT & DUNNER LLP (57) ABSTRACT

A method is disclosed, involving converting each structured text document stored in a database into one or more vectors, using the vectors of the structured text documents stored in a database to create a similarity search index, then for each structured text document from the database, searching the search index using the one or more vectors of the structured text document in order to generate a list of N other structured text document from the database similar to the structured text document based on said search; an storing each list of N other structured text document from the database similar to the structured text document in a table.

24 Claims, 4 Drawing Sheets

(56) References Cited

U.S. PATENT DOCUMENTS

| | | | |
|---|---|---|---|
| 2013/0198181 A1 | 8/2013 | Amer-Yahia et al. |
| 2017/0212882 A1 | 7/2017 | Rollins et al. |
| 2018/0300415 A1 | 10/2018 | Rehurek |
| 2019/0332644 A1 | 10/2019 | Freed et al. |
| 2020/0050638 A1 | 2/2020 | Hancock |
| 2020/0293608 A1 | 9/2020 | Nelson et al. |
| 2020/0380989 A1 | 12/2020 | Antunes et al. |
| 2021/0065041 A1 | 3/2021 | Gopalan et al. |

OTHER PUBLICATIONS

International Search Report for PCT Application No. PCT/US 22/26931, dated Aug. 16, 2022 (seven pages).
International Search Report for PCT Application No. PCT/US 22/26916, dated Aug. 16, 2022 (nine pages).
International Search Report for PCT Application No. PCT/US 22/26910, dated Aug. 16, 2022 (eight pages).
Office Action from Canadian Intellectual Property Office in Canadian patent application No. 3,172,934, mailed Jan. 24, 2024 (5 pages).
Office Action from Canadian Intellectual Property Office in Canadian patent application No. 3,172,992, mailed Jan. 26, 2024 (4 pages).
Office Action from Canadian Intellectual Property Office in Canadian patent application No. 3,172,963, mailed Jan. 25, 2024 (4 pages).

\* cited by examiner

ARTIFICIAL INTELLIGENCE ASSISTED ORIGINALITY EVALUATOR

CROSS-REFERENCE TO RELATED APPLICATIONS

This application claims priority to provisional patent application No. 63/181,560, filed Apr. 29, 2021.

BACKGROUND

Field

Embodiments of the present disclosure relate to Artificial Intelligence Tools for identifying reviewers and locating similar papers. In particular, some embodiments disclose a system and a method for identifying relent reviewers for submissions, while some embodiments disclose a system for identifying similar documents to a given submission.

Description of Related Art

Before the advent of modern machine learning, the peer review process could be assisted only minimally by computers. Editors and managers of scientific or academic journals or publishers rely on external reviewers in the field of a particular paper or submission to ensure the submission complies with best practices and methodologies of the relevant scientific or academic field.

However, one risk of identifying reviewers personally known to editors and managers is reviewer fatigue—editors and managers who return to known reliable reviewers time and again may exhaust the willingness of that reviewers to contribute, or overburden the reviewer accidentally. Similarly, without a pipeline from which to draw new reviewers outside of personal connections, identifying new reviewers is a time-consuming and unreliable process.

A similar problem exists for evaluating the originality of a submission. Conventional search techniques or reliance on the personal knowledge of editors are limited by the ability of the editor in question to generate search terms or properly identify similar documents. Existing tools cannot accurately perform this analysis.

Therefore, there is a need for improved methods for leveraging machine learning to identify and recommend reviewers for scientific or academic journal submissions, as well as to evaluate the originality of each submission.

SUMMARY

One aspect of the present disclosure is directed at a method for identifying similar structured text documents to other structured text documents. The method comprises, for example, converting each structured text document stored in a database into one or more vectors, each structured text document in the database having a title, an abstract, an author, a full text, and metadata. The method further comprises, for example using the vectors of the structured text documents stored in a database to create a similarity search index. The method further comprises, for example, for each structured text document from the database, searching the search index using the one or more vectors of the structured text document. The method further comprises, for example, for each structured text document from the database, generating a list of N other structured text document from the database similar to the structured text document based on said search. Finally, the method further comprises, for example storing each list of N other structured text document from the database similar to the structured text document in a table.

Yet another aspect of the present disclosure is directed at a system for identifying similar structured text documents to other structured text documents, comprising at least one processor, and at least one non-transitory computer readable media storing instructions configured to cause the processor to, for example, convert each structured text document stored in a database into one or more vectors, each structured text document in the database having a title, an abstract, and an author. The processor may further be configured to use the vectors of the structured text documents stored in a database to create a similarity search index. The processor may further be configured to, for each structured text document from the database, search the search index using the one or more vectors of the structured text document. The processor may further be configured to, for each structured text document from the database, generate a list of N other structured text document from the database similar to the structured text document based on said search. Finally, the processor may further be configured to store each list of N other structured text document from the database similar to the structured text document in a table.

DETAILED DESCRIPTION

It is an object of embodiments of the present disclosure to improve the workflow for editors and managers of scientific or academic publishing houses. Scientific articles and other similar types of academic works, submitted as structured text documents, require peer-review before publication in order to ensure the structured text document comports with best practices and methodologies of the relevant scientific or academic field. It would also be useful to evaluate these structured text document for originality by comparing pre-publication works to published works. Methods are provided for identifying reviewers and similar articles to structured text documents.

It should be understood that the disclosed embodiments are intended to be performed by a system or similar electronic device capable of manipulating, storing, and transmitting information or data represented as electronic signals as needed to perform the disclosed methods. The system may be a single computer, or several computers connected via the internet or other telecommunications means.

A method involves the comparison of structured text documents, the structured text documents having a title, an abstract, and an author. A structured text document may be a draft, a manuscript, a book, an article, a thesis, a dissertation, a monograph, a report, a proceeding, a standard, a patent, a preprint, a grant, or other working text. An abstract may be a summary, synopsis, digest, precis, or other abridgment of the structured text document. An author may be any number of individuals or organizations. A structured text document may also have a full text, body, or other content. A structured text document may also have metadata, such as citations. A person of ordinary skill in the art would understand that a structured text document could take many forms, such as a Word file, PDF, LaTeX, or even raw text.

A method may involve the system receiving a new structured text document. The new structured text document may be received by various means, including electronic submission portal, email, a fax or scan of a physical copy converted into a structured text document through a process such as optical character recognition or similar means, or other means for digital transmission.

The system may convert the new structured text document into a vector or vectors using a natural language processing algorithm with a vector output. In broad terms, suitable algorithms accept text as input and render a numerical representation of the input text, known as a vector, as output. Suitable natural language processing algorithms include examples such as Doc2Vec, GloVe/PCA projection, BERT, SciBERT, or SPECTER, or Universal Sentence Encoder, though a person of ordinary skill in the art may recognize other possible natural language processing algorithms. A vector, in some embodiments, can be a mathematical concept with magnitude and direction. In other embodiments, a vector can be a collection of values representing a word's meaning in relation to other words. In yet other embodiments, a vector can be a collection of values representing a text's value in relation to other texts.

Two embodiments of a vector can be vector 1 with the values (A, B) and vector 2 with the values (C, D) where A, B, C, and D are variables representing any number. One possible measure of distance, the Euclidean distance, between vector 1 and vector 2 is equal to $\sqrt{(C-A)^2+(D-B)^2}$. Of course, one skilled in the art can recognize that vectors can have any number of values. One skilled in the art would also recognize measures of distance between vectors beyond the Euclidean distance.

In some embodiments, different components of a structured text document may be converted into separate vectors. In other embodiments, not all components of a structured text document are converted into a vector. For example, if a structured text document has a title, abstract, author, metadata, and full text, the title and abstract may be converted into one vector, the full text into another, the metadata into one or more vectors, and the author is not converted into a vector.

In some embodiments, the structured text document database may be implemented as a collection of training data, such as the Microsoft Academic Graph, or may be implemented using any desired collection of structured text documents such as a journal's archive or catalog. The database may be implemented through any suitable database management system such as Oracle, SQL Server, MySQL, PostgreSQL, Microsoft Access, Amazon RDS, HBase, Cassandra, MongoDB, Neo4J, Redis, Elasticsearch, Snowflake, BigQuery, or the like.

In some embodiments, the system may convert each structured text document stored in a database into a vector or vectors using the same algorithms as described for the new structured text document. The structured text documents stored in the database may also have a reviewer, editor, or other non-authorial contributor.

In some embodiments, the system may build a search index using the vectors of the structured text documents stored in the database. The search index may be of any suitable type, such as a flat index, a locality sensitive hash (LSH), an inverted file index (IVF), or a Hierarchical Navigable Small World (HNSW) graph. In embodiments where structured text documents are converted into multiple vectors, the multiple vectors of a structured text document can be concatenated into a single vector before the search index is built. In other embodiments where structured text documents are converted into multiple vectors, each type of vector is used to build a search index for that type of vector.

In some embodiments, the system uses the vector or vectors of the new structured text document to search the search index. The search may be performed using any suitable algorithm, such as K-nearest neighbors or K-means clustering. In embodiments using multiple vectors for structured text documents, where the vectors are concatenated into one vector before the search index is built, the multiple vectors of the new structured text document are likewise concatenated before searching the search index. In other embodiments where structured text documents are converted into multiple vectors, and where different search indexes are built for different types of vectors, each vector of the additional structured text document are searched separately, and the results ensembled together. Ensembling the results may be as simple as averaging the results, though more complex methods of ensembling are possible. Based on the search results, the system identifies the N most similar structured text documents from the database to the new structured text documents are. N may be any desired number, such as 10 or 100, based on the needs of the implementers. For example, after experimentation, the inventors determined that looking at the top 100 most similar structured text documents and compiling their authors and reviewers led to a higher chance of overlap. The inventors found that 100 structured text documents strike a good balance between good results and manageable data size and computation cost.

In some embodiments, once the system identifies the N most similar structured text documents from the database, the system compiles the reviewers and authors associated with the N most similar structured text documents from the database. In one embodiment, the structured text document database is queried to provide the information on authors and reviewers for each of the N most similar structured text documents from the database. In some embodiments, compilation may consist of listing all authors and reviewers of each structured text document on the list of similar documents. In some embodiments, compilation can consist of weighing authors and reviewers, by, for example, listing authors and reviewers who authored or reviewed more than one document from the list of similar documents as the first recommended reviewers. In another embodiment, compilation can consist of listing the authors and reviewers of the most similar structured text document to the new structured text document first on the list of recommended reviewers.

For an illustrative example of compiling the reviewers and authors, consider a system configured to identify the two most similar (N=2) structured text documents. The system identifies Text 1, and Text 2. Text 1 has a similarity score of 0.5 and the authors author 1, author 2, and author 3 and the reviewers reviewer 1, reviewer 2, and reviewer 3. The system also identifies Text 2 with similarity score 0.4, authors author 1, author 4, and author 5, and reviewers reviewer 4, reviewer 2, and reviewer 3. In some embodiments, the similarity score of a structured text document is 1 minus the distance between the vector of the additional structured text document and the structured text document, though other methods of calculating similarity score are possible. The compilation of authors would result in the follows ranking:

Author 1=0.5+0.4=0.9
Author 2=0.5
Author 3=0.5
Author 4=0.4
Author 5=0.4

The compilation of reviewers would result in the follows ranking:

Reviewer 2=0.5+0.4=0.9
Reviewer 3=0.5+0.4=0.9
Reviewer 1=0.5
Reviewer 4=0.4

A further method may involve the system converting each structured text document stored in a database into a vector, each structured text document in the database having a title, an abstract, and an author. A structured text document may be a draft, a manuscript, a book, an article, a thesis, a dissertation, a monograph, a report, a proceeding, a standard, a patent, a preprint, a grant, or other working text. An abstract may be a summary, synopsis, digest, precis, or other abridgment of the structured text document. An author may be any number of individuals or organizations. A structured text documents may also have a full text, body, or other content. A structured text document may also have metadata, such as citations. The structured text documents stored in the database may also have a reviewer, editor, or other non-authorial contributor. A person of ordinary skill in the art would understand that a structured text document could take many forms, such as a Word file, PDF, LaTeX, or even raw text.

In some embodiments, the structured text document database may be implemented as a collection of training data, such as the Microsoft Academic Graph, or may be implemented using any desired collection of structured text documents such as a journal's archive or catalog. The database may be implemented through any suitable database management system such as Oracle, SQL Server, MySQL, PostgreSQL, Microsoft Access, Amazon RDS, HBase, Cassandra, MongoDB, Neo4J, Redis, Elasticsearch, Snowflake, BigQuery, or the like.

The system's conversion of each structured text document into a vector or vectors may be accomplished by a natural language processing algorithm with a vector output. In broad terms, suitable algorithms accept text as input and render a numerical representation of the input text, known as a vector, as output. Suitable natural language processing algorithms include examples such as Doc2Vec, GloVe/PCA projection, BERT, SciBERT, SPECTER, or Universal Sentence Encoder, though a person of ordinary skill in the art may recognize other possible natural language processing algorithms. A vector, in some embodiments, can be a mathematical concept with magnitude and direction. In other embodiments, a vector can be a collection of values representing a word's meaning in relation to other words. In yet other embodiments, a vector can be a collection of values representing a texts value in relation to other texts.

In some embodiments, different components of a structured text document may be converted into separate vectors by the system. In other embodiments, not all components of a structured text document are converted into a vector. For example, if a structured text document in the structured text document database has a title, abstract, author, full text, and metadata, the title and abstract may be converted into one vector, the full text into another, metadata into one or more vectors, and the author is not converted into a vector.

In some embodiments, the system may build a search index using the vectors of the structured text documents stored in the database. The search index may be of any suitable type, such as a flat index, a locality sensitive hash (LSH), an inverted file index (IVF), or a Hierarchical Navigable Small World (HNSW) graph. In embodiments where structured text documents are converted into multiple vectors, the multiple vectors of a structured text document can be concatenated into a single vector before the search index is built. In other embodiments where structured text documents are converted into multiple vectors, each type of vector is used to build a search index for that type of vector. In embodiments where structured text documents are converted into multiple vectors, the multiple vectors of a structured text document can be concatenated into a single vector before the search index is built. In other embodiments where structured text documents are converted into multiple vectors, each type of vector is used to build a search index for that type of vector.

In some embodiments, the system uses the vector or vectors of the new structured text document to search the search index. The search may be performed using any suitable algorithm, such as K-nearest neighbors or K-means clustering. In embodiments using multiple vectors for structured text documents, where the vectors are concatenated into one vector before the search index is built, the multiple vectors of the new structured text document are likewise concatenated before searching the search index. In other embodiments where structured text documents are converted into multiple vectors, and where different search indexes are built for different types of vectors, each vector of the additional structured text document are searched separately, and the results ensembled together. Ensembling the results may be as simple as averaging the results, though more complex methods of ensembling are possible. Based on the search results, the system identifies the N most similar structured text documents from the database to the new structured text documents. N may be any desired number, such as 50, based on the needs of the implementers. For example, after experimentation, the inventors determined that looking at the top 50 most similar structured text documents led to higher quality lists of similar structured text documents. The inventors found that 50 structured text documents strike a good balance between good results and manageable data size and computation cost.

In some embodiments, the system may select the list of similar documents based on the search of the similarity search index for most similar vectors to the vector of the new structured text document. The list of similar documents may be the N-nearest structured text documents to each structured text document, or it may be all structured text documents within a certain distance D of each structured new structured text document.

In some embodiments, the system stores each list of similar documents in a table constructed by aggregating each list of similar documents for each document in the structured text document database. In some embodiments, the table may be implemented as a simple array of arrays or list of lists. In other embodiments, the table may be a more sophisticated data structure, such as an Oracle, SQL Server, MySQL, PostgreSQL, Microsoft Access, Amazon RDS, HBase, Cassandra, MongoDB, Neo4J, Redis, Elasticsearch, Snowflake, or BigQuery database or data structure store.

New structured text documents may be searched against the database of structured text documents. The new structured text document may be received by various means, including electronic submission portal, email, a fax or scan of a physical copy converted into a structured text document through a process such as optical character recognition or similar means, or other means for digital transmission.

Once received by the system performing a disclosed embodiment, the new structured text document may be converted into one or more vector. Conversion of the new structured text document into one or more vector may be accomplished as previously described. Then, the vector of the new structured text document is searched against the vectors of each structured text document in the database, which are stored in the similarity search index. Based on that comparison a list of similar documents is generated, consistent with the preceding description generating a list of similar documents. The list of similar documents for the new structured text document is added to the results table.

Figure 1:
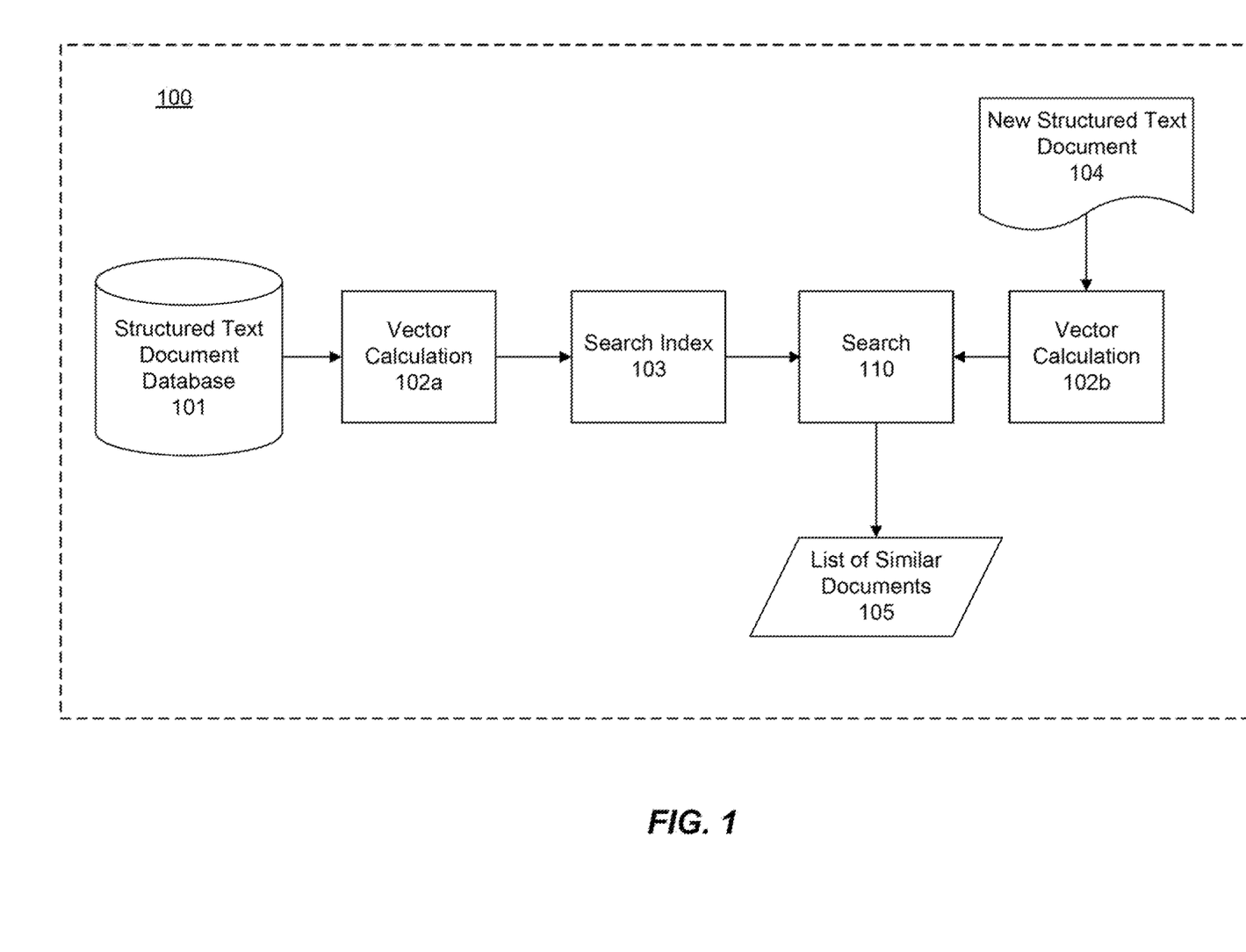
FIG. 1 depicts a system for performing a method of finding similar structured text documents stored in a database to a new structured text document.

FIG. 1 shows a schematic block diagram 100 of a system for performing the disclosed exemplary embodiment of a method including computerized systems for identifying similar structured text documents. In some embodiments, system 100 involves structured text document database 101, vector calculations 102a and 102b, search index 103, search 110, new structured text document 104, and a list of similar documents 105.

In some embodiments, system 100 should be understood as a computer system or similar electronic device capable of manipulating, storing, and transmitting information or data represented as electronic signals as needed to perform the disclosed methods. System 100 may be a single computer, or several computers connected via the internet or other telecommunications means.

In some embodiments, the structured text document database 101 may be implemented as a collection of training data, such as the Microsoft Academic Graph, or may be implemented using any desired collection of structured text documents such as a journal's archive. The database may be implemented through any suitable database management system such as Oracle, SQL Server, MySQL, PostgreSQL, Microsoft Access, Amazon RDS, HBase, Cassandra, MongoDB, Neo4J, Redis, Elasticsearch, Snowflake, BigQuery, or the like.

In some embodiments, vector calculation 102a and 102b may be implemented by system 100 using a natural language processing algorithm with a vector output. In broad terms, suitable algorithms accept text as input and render a numerical representation of the input text, known as a vector, as output. Suitable natural language processing algorithms include examples such as Doc2Vec, GloVe/PCA projection, BERT, SciBERT, or SPECTER, or Universal Sentence Encoder, though a person of ordinary skill in the art may recognize other possible natural language processing algorithms. A vector, in some embodiments, can be a mathematical concept with magnitude and direction. In other embodiments, a vector can be a collection of values representing a word's meaning in relation to other words. In yet other embodiments, a vector can be a collection of values representing a texts value in relation to other texts.

In some embodiments, different components of a structured text document may be converted into separate vectors. In other embodiments, not all components of a structured text document are converted into a vector. For example, if a structured text document has a title, abstract, author, full text, and metadata, the title and abstract may be converted into one vector, the full text into another, the metadata into one or more vectors, and the author is not converted into a vector. In other embodiments, different components of a structured text documents may be combined and converted into a single vector or may be converted into respective vectors.

In some embodiments, the system may build a search index 103 using the vectors of the structured text documents stored in the database. The search index may be of any suitable type, such as a flat index, a locality sensitive hash (LSH), an inverted file index (IVF), or a Hierarchical Navigable Small World (HNSW) graph. In embodiments where structured text documents are converted into multiple vectors, the multiple vectors of a structured text document can be concatenated into a single vector before the search index is built. In other embodiments where structured text documents are converted into multiple vectors, each type of vector is used to build a search index for that type of vector.

In some embodiments, the system uses the vector or vectors of the new structured text document to search 110 the search index 103. The search may be performed using any suitable algorithm, such as K-nearest neighbors or K-means clustering. In embodiments using multiple vectors for structured text documents, where the vectors are concatenated into one vector before the search index is built, the multiple vectors of the new structured text document are likewise concatenated before searching the search index. In other embodiments where structured text documents are converted into multiple vectors, and where different search indexes are built for different types of vectors, each vector of the additional structured text document are searched separately, and the results ensembled together. Ensembling the results may be as simple as averaging the results, though more complex methods of ensembling are possible. Based on the search results, the system identifies the N most similar structured text documents from the database to the new structured text documents are. N may be any desired number, such as 10 or 100, based on the needs of the implementers. For example, after experimentation, the inventors determined that looking at the top 100 most similar structured text documents and compiling their authors and reviewers led to a higher chance of overlap. The inventors found that 100 structured text documents strike a good balance between good results and manageable data size and computation cost.

In some embodiments, the new structured text document 104 may be a draft, manuscript, a book, an article, a thesis, a dissertation, a monograph, a report, a proceeding, a standard, a patent, a preprint, a grant, or other working text. An abstract may be a summary, synopsis, digest, precis, or other abridgment of the structured text document. An author may be any number of individuals or organizations. The new structured text documents may also have a full text, body, or other content. The new structured text document may also have metadata, such as citations.

In some embodiments, the system may select the list of similar documents 105 based on the search 110 of the search index 103 using the vector of the new structured text document 104. The list of similar documents 105 may be the N-nearest structured text documents to the new structured text document, or it may be all structured text documents within a certain distance D of the new structured text document.

Figure 2:
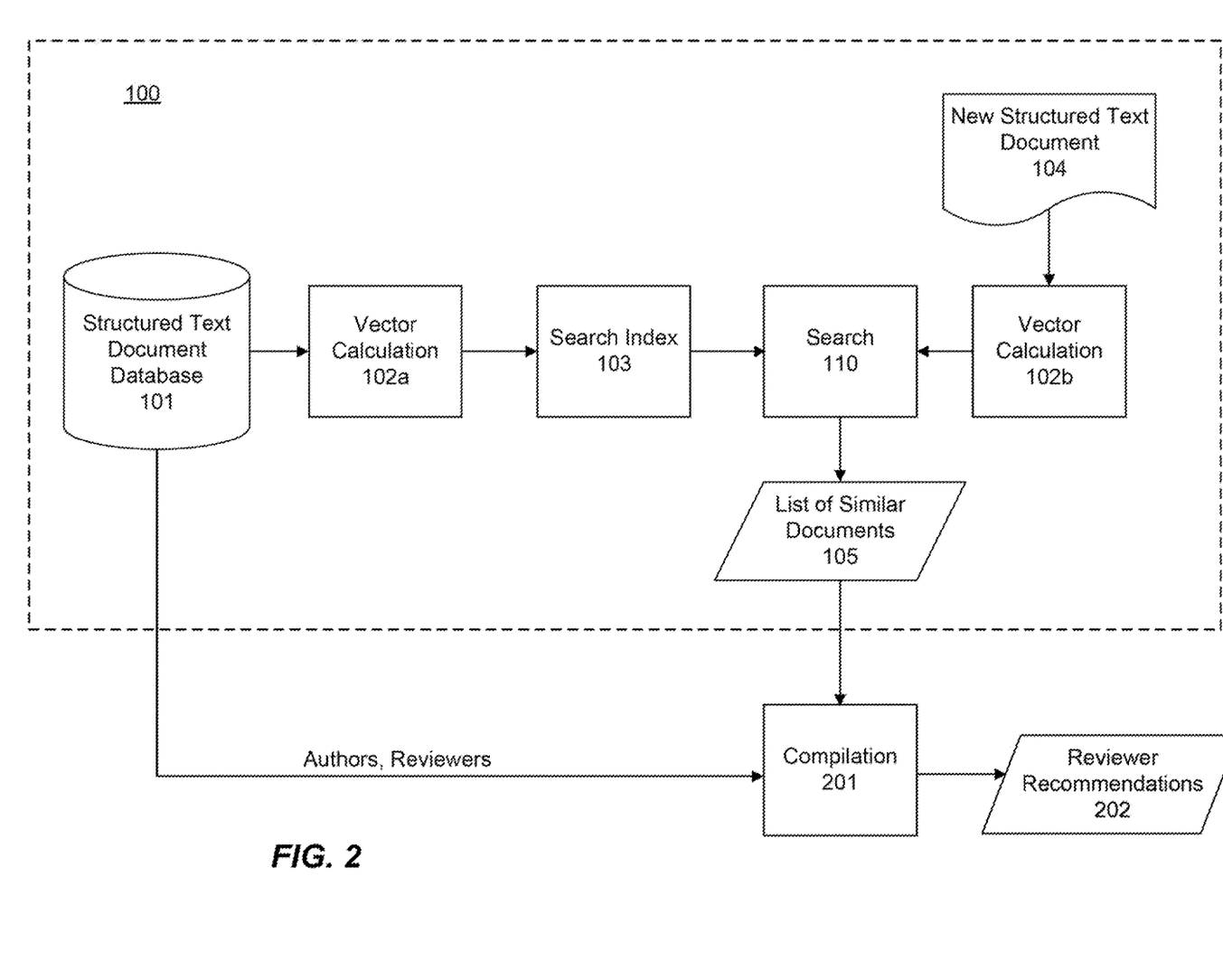
FIG. 2 depicts further embodiments of the system from FIG. 1, where the method is used to generate a list of recommended reviewers for the new structured text document.

Referring now to FIG. 2, further embodiments of the disclosed system 100 are shown for performing the disclosed methods of providing a list of recommended reviewers for a new structured text document. In one embodiment, the structured text document database 101 includes information on the authors and reviewers of the structured text documents it contains.

The vector calculation 102a and 102b, search index 103, search 110 new structured text document 104, and list of similar documents 105 should be understood to have the same scope and functionality as disclosed in FIG. 1.

In some embodiments, the system performs compilation 201 after the list of similar documents, 105, is generated. For each structured text document on the list of similar documents 105, the structured text document database is queried to provide the information on authors and reviewers for each document. This information is compiled to provide a list of recommended reviewers for the new structured text document, 202.

In some embodiments, the system performs compilation 201 by generating a list, stored as an index or other data structure, consist of all authors and reviewers of each structured text document on the list of similar documents. In some embodiments, the list generated as a result of compilation 201 can consist of a ranked list where authors and reviewers are listed in order of, for example, the number of times their name appears as an authors or reviewers of a document on the list of similar documents 105. In another embodiment, the list generated by compilation 201 can consist of a listing of the authors and reviewers in order of how similar the structured text document they are associated with is to the new structured text document.

Figure 3:
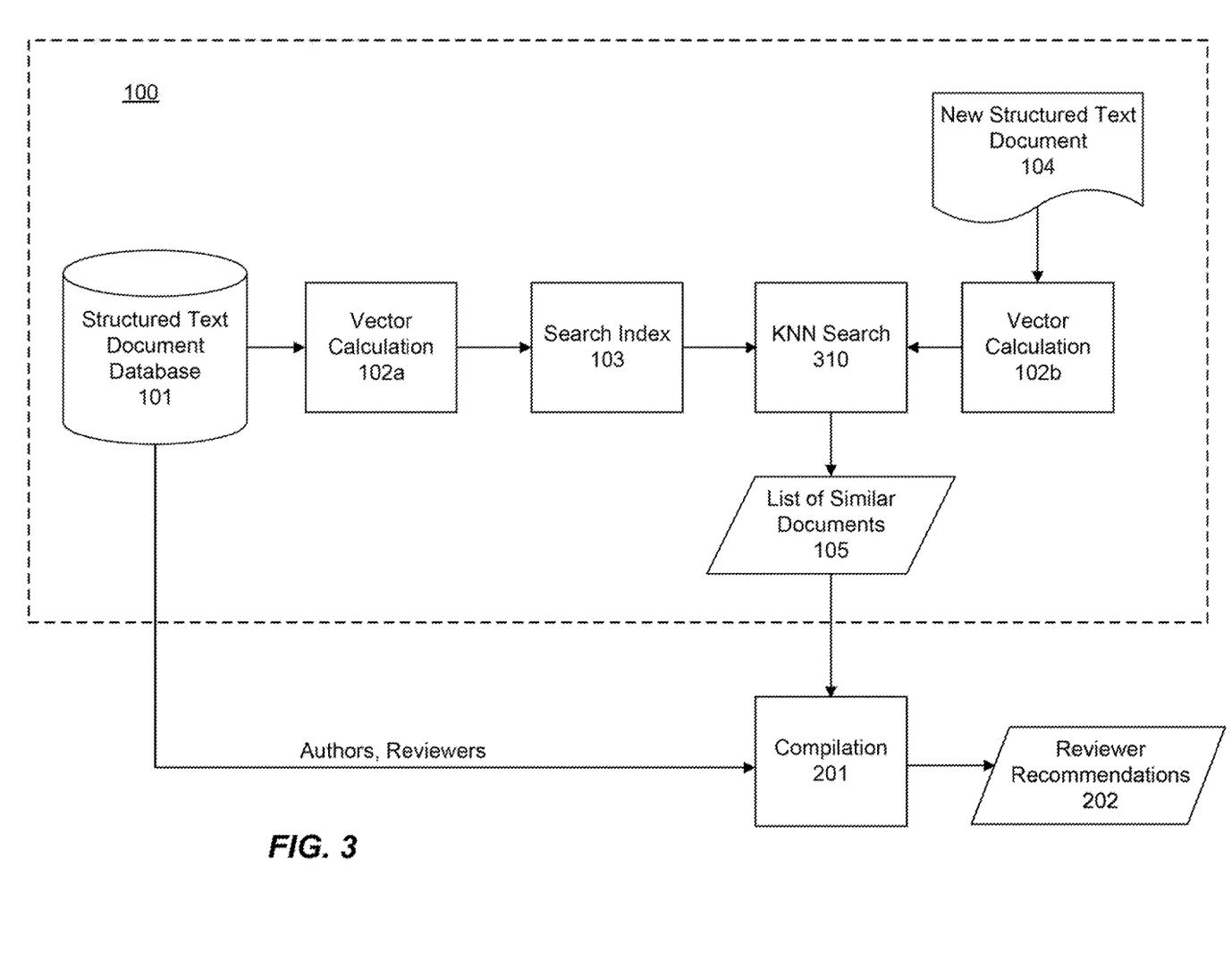
FIG. 3 depicts further embodiments of the system from FIG. 2.

Referring now to FIG. 3, further embodiments of the disclosed system 100 for performing the disclosed methods are shown. The vector calculation 102, new structured text document 104, and list of similar documents 105 should be understood to have the same scope and functionality as disclosed in FIG. 1. The compilation 201 and list of recommended reviewers, 202 should be understood to have the same scope and functionality as disclosed in FIG. 2.

In the disclosed embodiments consistent with FIG. 3, the search 310 should be understood as being performed using the KNN algorithm for calculating the N-nearest structured text document vectors to the new structured text document vector. Distance between vectors can be calculated using any measure of similarity for comparing vectors, such as the Euclidian distance, Gaussian distance, or cosine similarity.

In some embodiments, KNN, or K-nearest neighbor, can be implemented using any measure of distance between vectors as previously described, such as Euclidian or Cosine distance. The algorithm is performed by a system such as system 100. Given a vector and a number of neighbors, K (hence the name, K nearest neighbor), the algorithm could calculate the distance between the vector and each vector in the search index. In practice, this is not done to improve search efficiency. Instead, the different types of search index, such as inverted file index (IVF), or a Hierarchical Navigable Small World (HNSW) graph break the search index into partitions of vectors, and KNN operates to search some of those partitions to identify the K-nearest vectors in the search index to the vector being using to search the search index. For example, if the search index is an IVF, the partitions are constructed as a Dirichlet tessellation. In a Dirichlet tessellation, the partitions start with centroids, which are fictional vectors placed into the search index as dividing points, but not associated with a structured text document. Each centroid defines a partition consisting of all vectors closer to the centroid than any other centroid. Searching the IVF search index with a vector (the search, or query vector) begins with identifying the centroid closed to the search vector. Then, the KNN algorithm is used to compute the distances between each vector in that centroid's partition, and the search vector. The K vectors in the partition associated with the K smallest distances are reported by the KNN algorithm as the K-nearest neighbors to the search vector. In some embodiments, the KNN algorithm is used to compute the distances between the search vector and the vectors associated with the centroids adjacent to the centroid closest to the search vector, to avert omitting vectors that are close to the search vector but in another partition.

Figure 4:
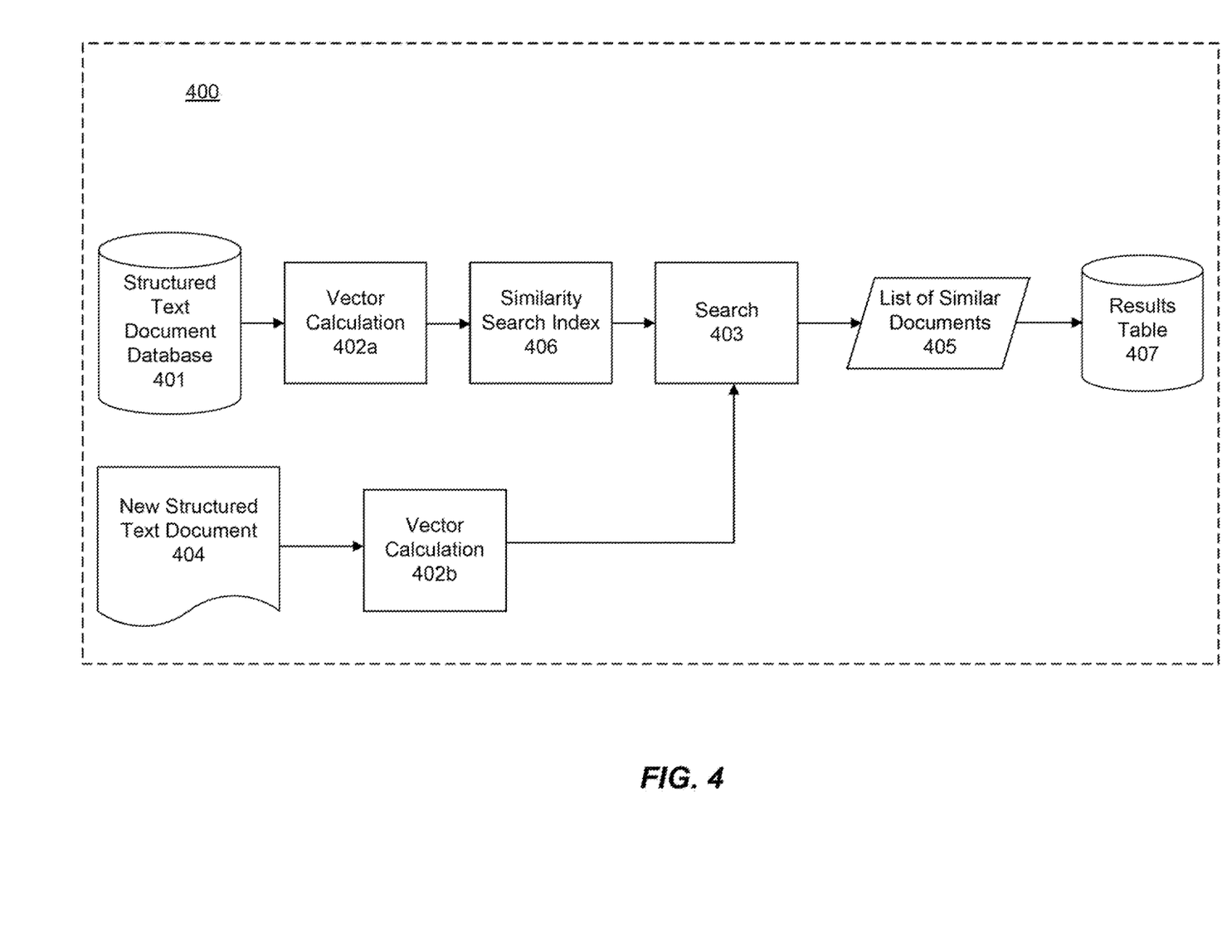
FIG. 4 depicts a system for performing a method of generating a table of similar structured text documents

FIG. 4 shows a schematic block diagram 400 of a system for performing the disclosed exemplary embodiment of another method including computerized systems for identifying similar structured text documents. In some embodiments, system 400 involves structured text document database 401, vector calculation 402a, and 402b, search 403, new structured text document 404, a list of similar documents 405, results table 407 and similarity search index 406.

In some embodiments, system 400 should be understood as a computer system or similar electronic device capable of manipulating, storing, and transmitting information or data represented as electronic signals as needed to perform the disclosed methods. System 400 may be a single computer, or several computers connected via the internet or other telecommunications means.

In some embodiments, the structured text document database 401 may be implemented as a collection of training data, such as the Microsoft Academic Graph, or may be implemented using any desired collection of structured text documents such as a journal's archive. The database may be implemented through any suitable database management system such as Oracle, SQL Server, MySQL, PostgreSQL, Microsoft Access, Amazon RDS, HBase, Cassandra, MongoDB, Neo4J, Redis, Elasticsearch, Snowflake, BigQuery, or the like.

In some embodiments, vector calculation 402a and 402b may be implemented using a natural language processing algorithm with a vector output. In broad terms, suitable algorithms accept text as input and render a numerical representation of the input text, known as a vector, as output. Suitable natural language processing algorithms include examples such as Doc2Vec, GloVe/PCA projection, BERT, SciBERT, SPECTER, or Universal Sentence Encoder, though a person of ordinary skill in the art may recognize other possible natural language processing algorithms. A vector, in some embodiments, can be a mathematical concept with magnitude and direction. In other embodiments, a vector can be a collection of values representing a word's meaning in relation to other words. In yet other embodiments, a vector can be a collection of values representing a text's value in relation to other texts.

In some embodiments, different components of a structured text document may be converted into separate vectors by vector calculations 402a, and 402b. In other embodiments, not all components of a structured text document are converted into a vector by vector calculations 402a, and 402b. For example, if a structured text document in structured text document database 401 has a title, abstract, author, full text, and metadata, the title and abstract may be converted into one vector, the full text into another, metadata into one or more vectors, and the author is not converted into a vector.

In some embodiments, the similarity search index 406 is constructed by system 100, which converts each structured text document stored in the structured text document database 401 into one or more vectors through vector calculation 402a. The vector for each structured text document is stored in the similarity search index. The search index may be of any suitable type, such as a flat index, a locality sensitive hash (LSH), an inverted file index (IVF), or a Hierarchical Navigable Small World (HNSW) graph. In some embodiments, the similarity search index 406 may be implemented using specialized vector search index tools such as FAISS (Facebook AI Similarity Search) or Non-Metric Space Library (NMSLIB). In embodiments where structured text documents are converted into multiple vectors, the multiple vectors of a structured text document can be concatenated into a single vector before the search index 406 is built. In other embodiments where structured text documents are converted into multiple vectors, each type of vector is used to build a search index 406 for that type of vector.

In some embodiments, the search 403 is a mathematical operation that can be performed by system 100 using any measure of similarity for comparing vectors, such as the Euclidian distance, Gaussian distance, or cosine similarity.

In some embodiments, the system uses the vector or vectors of each structured text document to search the search index 406. The search 403 may be performed using any suitable algorithm, such as K-nearest neighbors or K-means clustering. In embodiments using multiple vectors for structured text documents, where the vectors are concatenated into one vector before the search index is built, the multiple vectors of the structured text document are likewise concatenated before searching the search index. In other embodiments where structured text documents are converted into multiple vectors, and where different search indexes are built for different types of vectors, each vector of each structured text document are searched separately, and the results ensembled together. Ensembling the results may be as simple as averaging the results, though more complex methods of ensembling are possible. Based on the search results, the system identifies the N most similar structured text documents from the database to each structured text documents are. N may be any desired number, such as 50, based on the needs of the implementers. For example, after experimentation, the inventors determined that looking at the top 50 most similar structured text documents led to higher quality lists of similar structured text documents. The inventors found that 50 structured text documents strike a good balance between good results and manageable data size and computation cost.

In some embodiments, the system may select the list of similar documents 405 based on the search 403 of the similarity search index for most similar vectors to the vector of the new structured text document 404. The list of similar documents 405 may be the N-nearest structured text documents to each structured text document, or it may be all structured text documents within a certain distance D of each structured new structured text document.

In some embodiments, the results table 407 is constructed by system 100 by aggregating each list of similar documents for each document in the structured text document database 401. In some embodiments, the results table 407 may be implemented as a simple array of arrays or list of lists. In other embodiments, results table 407 may be a more sophisticated data structure, such as an Oracle, SQL Server, MySQL, PostgreSQL, Microsoft Access, Amazon RDS, HBase, Cassandra, MongoDB, Neo4J, Redis, Elasticsearch, Snowflake, or BigQuery database or data structure store.

In some embodiments, the new structured text document 404 may be a draft, manuscript, a book, an article, a thesis, a dissertation, a monograph, a report, a proceeding, a standard, a patent, a preprint, a grant, or other working text. An abstract may be a summary, synopsis, digest, precis, or other abridgment of the structured text document. An author may be any number of individuals or organizations. The new structured text documents may also have a full text, body, or other content. The new structured text document may also have metadata, such as citations In some embodiments, the new structured text document 404 is converted into one or more vector using vector calculation 402*b*. Then, the vector of the new structured text document is searched 403 against the vectors of each structured text document in the database, which are stored in the similarity search index 406. Based on that search 403 a list of similar documents 405 is generated, consistent with the preceding description generating a list of similar documents 405. The list of similar documents 405 for the new structured text document 404 is added to the results table 407.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Python, Java, C/C++, Objective-C, Swift, HTML, HTML/AJAX combinations, XML, or HTML with included Java applets.

What is claimed is:

1. A method comprising:
    converting each structured text document stored in a database into one or more vectors, each structured text document in the database having a title, an abstract, and an author;
    using the vectors of the structured text documents stored in a database to create one or more similarity search index;

for each structured text document from the database, searching the search index using the one or more vectors of the structured text document;

for each structured text document from the database, generating a list of at least N other structured text documents from the database similar to the structured text document based on said search, wherein N equals 50; and storing each list of at least N other structured text documents from the database similar to the structured text document in a table.

2. The method of claim 1, further comprising:
receiving a new structured text document, the new structured text document having a title, an abstract, and an author;
converting the new structured text document into one or more vectors; searching the search index using the one or more vectors of the new structured text document;
generating a second list of at least N structured text documents from the database similar to the new structured text document using the said search index; and
storing the second list of at least N structured text documents from the database similar to the new structured text document in a second table.

3. The method of claim 1, wherein converting each structured text document stored in the database into one or more vectors comprises converting the structured text document into one or more vectors by means of SPECTER embedding.

4. The method of claim 3, further comprising:
receiving a new structured text document, the new structured text document having a title, an abstract, and an author;
converting the new structured text document into one or more new vectors by means of SPECTER embedding;
searching the search index using the one or more new vectors of the new structured text document;
generating a second list of at least N structured text documents from the database similar to the new structured text document using the said search index; and
storing the second list of at least N structured text documents from the database similar to the new structured text document in a second table.

5. The method of claim 1, wherein:
each structured text document stored in the database is associated with a full text.

6. The method of claim 5, further comprising:
receiving a new structured text document, the new structured text document having a title, an abstract, an author, and a full text;
converting the new structured text document into one or more new vectors;
searching the search index using the one or more new vectors of the new structured text document;
generating a second list of N structured text documents from the database similar to the new structured text document using the said search index; and
storing the second list of at least N structured text documents from the database similar to the new structured text document in a second table.

7. The method of claim 1, wherein:
each structured text document stored in the database is associated with a metadata.

8. The method of claim 7, further comprising:
receiving a new structured text document, the new structured text document having a title, an abstract, an author, and a metadata;
converting the new structured text document into one or more new vectors; searching the search index using the one or more new vectors;
generating a second list of at least N structured text documents from the database similar to the new structured text document based on said search; and
storing the second list of at least N structured text documents from the database similar to the new structured text document in a second table.

9. The method of claim 1, wherein:
converting each structured text document stored in the database into one or more vectors comprises converting each structured text document using a natural language processing algorithm; and
generating the list of at least N other structured text documents from the database similar to the structured text document based on said search comprises determining a similarity based on one or more of an Euclidian distance, a Gaussian distance, or a cosine similarity.

10. The method of claim 1, wherein the database is a collection of training data.

11. The method of claim 1, wherein the search index is one of a flat index type, a locally sensitive hash (LSH) type, an inverted file index type (IVF), or a Hierarchical Navigable Small World (HNSW) graph.

12. The method of claim 1, further comprising querying the database to compile a list of authors of each structured text document on the list of at least N structured text documents.

13. A system for identifying similar structured text documents to another structured text document, comprising:
at least one processor, and
at least one non-transitory computer readable media storing instructions configured to cause the processor to perform operations comprising:
converting each structured text document stored in a database into one or more vectors, each structured text document in the database having a title, an abstract, and an author;
using the vectors of the structured text documents stored in a database to create a similarity search index;
for each structured text document from the database, searching the search index using the one or more vectors of the structured text document
for each structured text document from the database, generating a list of at least N other structured text documents from the database similar to the structured text document based on said search, wherein N is 50; and
storing each list of at least N other structured text documents from the database similar to the structured text document in a table.

14. The system of claim 13, the operations further comprising:
receiving a new structured text document, the new structured text document having a title, an abstract, and an author;
converting the new structured text document into one or more new vectors;
searching the search index using the one or more new vectors of the new structured text document;
generating a second list of at least N structured text documents from the database similar to the new structured text document using the said search index; and storing the second list of at least N other structured text documents from the database similar to the new structured text document in a second table.

15. The system of claim 13, the operations further comprising:
converting the structured text document into one or more vectors by means of SPECTER embedding.

16. The system of claim 15, the operations further comprising:
receiving a new structured text document, the new structured text document having a title, an abstract, and an author;
converting the new structured text document into one or more new vectors by means of SPECTER embedding;
searching the search index using the one or more new vectors of the new structured text document;
generating a second list of at least N structured text documents from the database similar to the new structured text document using the said search index; and
storing the second list of at least N other structured text documents from the database similar to the new structured text document in a second table.

17. The system of claim 13, wherein:
each structured text document stored in the database is associated with a full text.

18. The system of claim 17, the operations further comprising:
receiving a new structured text document, the new structured text document having a title, an abstract, an author, and a full text;
converting the new structured text document into one or more new vectors;
searching the search index using the one or more new vectors of the new structured text document;
generating a second list of N structured text document from the database similar to the new structured text document using the said search index; and
storing the second list of N structured text documents from the database similar to the new structured text document in a second table.

19. The system of claim 13, wherein:
each structured text document stored in the database is associated with a metadata.

20. The system of claim 19, the operations further comprising:
receiving a new structured text document, the new structured text document having a title, an abstract, an author, and a metadata;
converting the new structured text document into one or more new vectors;
comparing the one or more new vectors of each structured text document to the vectors of the structured text documents from the database; and
generating a second list of at least N structured text document from the database similar to the new structured text document based on said comparison;
storing the second list of at least N structured text documents from the database similar to the new structured text document in a second table.

21. The system of claim 13, wherein:
converting each structured text document stored in the database into one or more vectors comprises converting each structured text document using a natural language processing algorithm; and
generating the list of at least N other structured text documents from the database similar to the structured text document based on said search comprises determining a similarity based on one or more of an Euclidian distance, a Gaussian distance, or a cosine similarity.

22. The system of claim 13, wherein the database is a collection of training data.

23. The system of claim 13, wherein the search index is one of a flat index type, a locally sensitive hash (LSH) type, an inverted file index type (IVF), or a Hierarchical Navigable Small World (HNSW) graph.

24. The system of claim 13, further comprising querying the database to compile a list of authors of each structured text document on the list of at least N structured text documents.

* * * * *

UNITED STATES PATENT AND TRADEMARK OFFICE
CERTIFICATE OF CORRECTION

PATENT NO. : 12,265,567 B2
APPLICATION NO. : 17/733351
DATED : April 1, 2025
INVENTOR(S) : Yinghao Ma et al.

It is certified that error appears in the above-identified patent and that said Letters Patent is hereby corrected as shown below:

In the Claims

Claim 18, Column 15, Line 35, "generating a second list of N structured text document" should read --generating a second list of N structured text documents--.

Claim 20, Column 16, Lines 14-15, "generating a second list of at least N structured text document" should read --generating a second list of at least N structured text documents--.

Signed and Sealed this
First Day of July, 2025

Coke Morgan Stewart
*Acting Director of the United States Patent and Trademark Office*